J. S. ROBBINS.
POTATO DIGGER.
APPLICATION FILED SEPT. 17, 1904.
923,079.
Patented May 25, 1909.
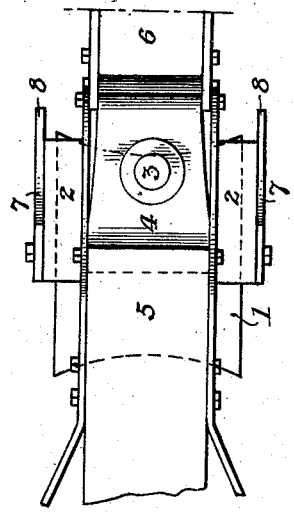
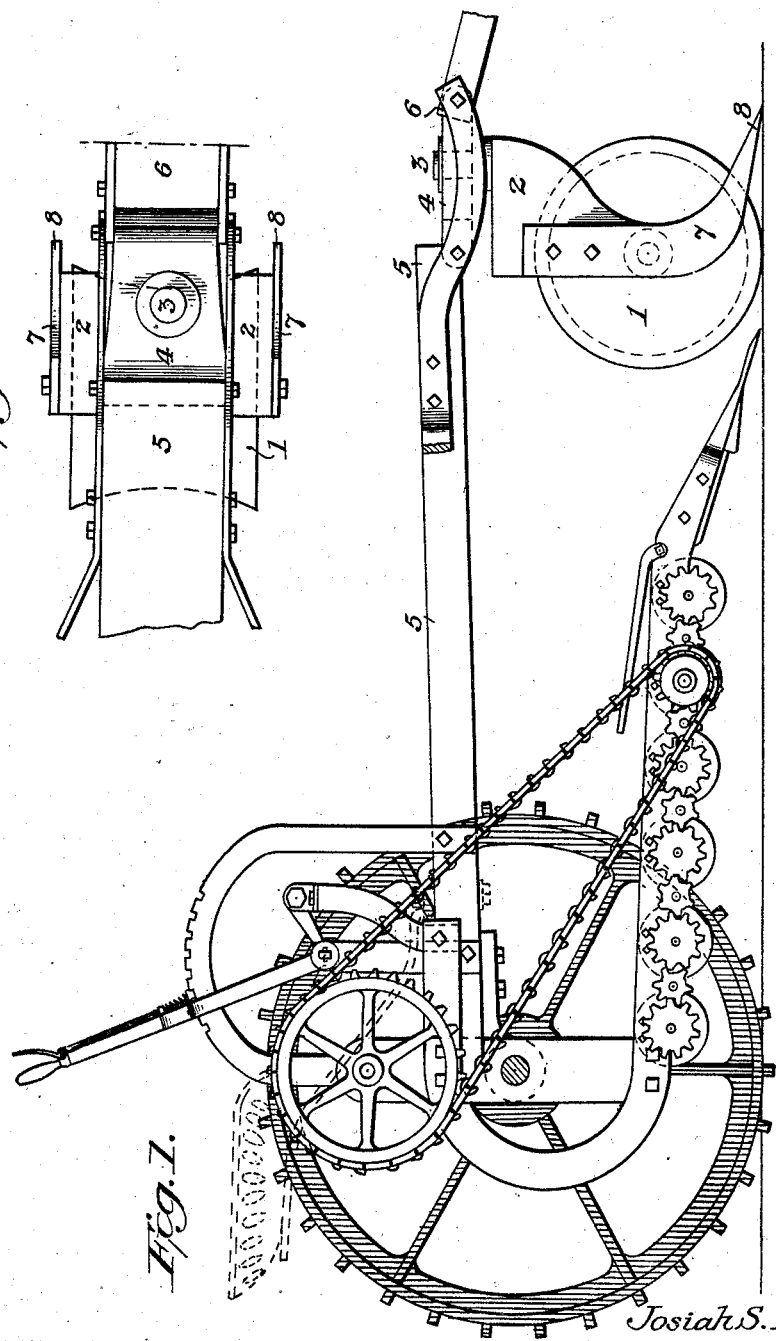
Witnesses
C. M. Walker,
A. E. Powell
Inventor
Josiah S. Robbins,
By Howson & Howson
his Attorneys

UNITED STATES PATENT OFFICE.

JOSIAH S. ROBBINS, OF ALLENTOWN, NEW JERSEY.

POTATO-DIGGER.

No. 923,079.     Specification of Letters Patent.     Patented May 25, 1909.

Original application filed December 7, 1900, Serial No. 39,054. Divided and this application filed September 17, 1904. Serial No. 224,791.

*To all whom it may concern:*

Be it known that I, JOSIAH S. ROBBINS, a citizen of the United States, residing in Allentown, Monmouth county, New Jersey, have invented certain Improvements in Potato-Diggers, (being a division of my application for patent filed December 7, 1900, Serial No. 39,054), of which the following is a specification.

My invention consists of a special device for gathering the potato vines, grass and weeds into a row in line with the plow of the potato digger and crushing the same, whereby said vines, grass and weeds will be confined between the main frame of the same without danger of clogging any of the moving parts of the apparatus until said vines, etc., are finally dropped at the rear with the potatoes.

My invention is fully illustrated in the accompanying drawings, in which—

Figure 1 is a side elevation, partly in section, of a potato digger embodying my present improvements; and Fig. 2 is a plan view of a portion of the same.

In all forms of potato diggers, the ultimate end to be attained is to leave the potatoes in a row on the surface of the ground from which they may be readily picked up and placed in baskets or bags, and to separate the vines, weeds and grass from the potatoes so that the former may be readily raked up for burning or other disposition.

My present improvements comprise means whereby the vines are gathered in a narrow row and crushed, thereby reducing their bulk, before the plow reaches the work; the loosened vines being kept within the space of the main frame of the machine as the digging operation progresses, and said vines, together with all weeds and grass that may be found with the same, passing through with the potatoes and finally dropping at the rear of the machine.

My present improvements have been applied to a machine of the type described and illustrated in my Patent, No. 771,800, of which this application is a division, and, hence, a detailed description of the same would seem to be unnecessary. I may say, however, that the digger shown herewith is provided with six sets or gangs of separating disks, differing in that respect only from the digger shown in my above mentioned patent.

In potato digging machines of this character, it is particularly desirable that the vines and accompanying weeds and grass be confined in as narrow a space as possible before the ground is opened by the plow and for this purpose I arrange at the front of the machine, being carried by the tongue or the frame of the machine to which the tongue is secured, a concaved roller 1, suitably mounted. As shown in the drawings, this mounting is somewhat similar to that of an ordinary caster, but I do not wish to be confined to the exact manner of mounting the roller.

The mounting, as shown in the drawings, comprises a frame 2, in which said roller is journaled, said frame having a pin 3 adapted to a suitable bearing or opening in a block casting 4 disposed between the beam 5 of the machine and the tongue 6. Disposed adjacent the roller 1, and shown as carried by the frame 2, are a pair of arms 7 curved in a forward direction and having their points 8 mounted close to the ground or in such position that they may enter it. These arms pass under the vines and serve to gather them together pushing them toward the center of the line of movement as the machine is carried forward so that they may be crushed by the roller 1. This gathering and crushing of the vines prevents their spreading apart after the plow or shovel has done its work and the vines are confined within the space of the frame of the machine and pass rearwardly with the potatoes without danger of clogging any of the working parts.

By having the vine gathering arms projected in front of the roller they may engage the vines while the roller is on the hill holding the plant, thereby insuring the straightening and compacting of all the runners or branches of the vines.

I claim:

1. In combination with a potato digger having a frame and a digging member to be drawn through the ground, a crushing roller mounted in advance of said digging member, and vine gathering arms arranged adjacent to said roller on both sides of the same and having a portion projecting in advance of said roller, said arms being so disposed with respect to the roller as to engage and gather in line with the same the extended portions of the vines with which said roller is directly in contact.

2. In combination with a potato digger, means for crushing and gathering the vines in line with said machine, comprising a roller pivotally mounted on the front of the same, and depending arms at the sides of said roller, said arms having forwardly projecting portions arranged to draw the vines toward said roller so that it may pass over the same as the machine is moved, said arms being so disposed with respect to the roller as to engage and gather in line with the same the extended portions of the vines with which said roller is directly in contact.

3. In combination with a potato digger having a frame, a digging member to be drawn through the ground and a beam projecting from said frame, a support pivotally hung from said beam, a roller journaled in said support for crushing the vines in line with the machine, and vine gathering arms carried by said support and mounted adjacent said roller on both sides of the same, said arms being so disposed with respect to the roller as to engage and gather in line with the same the extended portions of the vines with which said roller is directly in contact.

4. In combination with a potato digger having a frame, a digging member and a beam projecting from said frame, a support pivotally hung from said beam, a concaved roller journaled in said support for crushing the vines in advance of the digging member, and vine gathering arms carried by said support and mounted on both sides of said roller, said arms being so disposed with respect to the roller as to engage and gather in line with the same the extended portions of the vines with which said roller is directly in contact.

In testimony whereof, I have signed my name to this specification, in the presence of two subscribing witnesses.

JOSIAH S. ROBBINS.

Witnesses:
  MURRAY C. BOYER,
  JOS. H. KLEIN.